United States Patent [19]
Van Herwijnen et al.

[11] 3,755,115
[45] Aug. 28, 1973

[54] METHOD OF MANUFACTURING ALUMINIUM ELECTRODE FOIL FOR ELECTROLYTE CAPACITORS

[75] Inventors: Arend Van Herwijnen; Pieter Marten Vogel, both of Centuurbaan, Zwolle, Netherlands

[73] Assignee: U.S. Philips Corporation, New York, N.Y.

[22] Filed: Dec. 28, 1970

[21] Appl. No.: 102,098

[30] Foreign Application Priority Data
Jan. 2, 1970 Netherlands.................. 7000002

[52] U.S. Cl. ..................... 204/129.75, 204/129.8
[51] Int. Cl. ...................... C23b 1/00, C23b 3/02
[58] Field of Search................ 204/141, 129.75, 204/129.80

[56] References Cited
UNITED STATES PATENTS
2,336,846  12/1943  Clark ................................ 204/141
3,085,950  4/1963  Thomas et al. ..................... 204/141

FOREIGN PATENTS OR APPLICATIONS
134,093  6/1959  U.S.S.R. ............................ 204/141
1,144,562  2/1963  Germany ........................... 204/41

Primary Examiner—John H. Mack
Assistant Examiner—T. Tufariello
Attorney—Frank R. Trifari

[57] ABSTRACT

Enlargement of the effective surface of aluminum foil for electrolytic capacitors by electrolytical etching in the aqueous solution of 1–5 mol/l of an alkali halogenide and 1–5 mol/l boric acid at a pH of between 0 and 2.5. 2.5

5 Claims, No Drawings

METHOD OF MANUFACTURING ALUMINIUM ELECTRODE FOIL FOR ELECTROLYTE CAPACITORS

The invention relates to a method of manufacturing aluminum electrode foil having an enlarged effective surface for use in electrolytic capacitors.

To enlarge the effective surface an aluminum foil is electrolytically etched. The capacitive surface enlargement obtained thereby is also dependent on the formation voltage. As a rule a chloride-containing aqueous solution, for example, a sodium chloride solution is used as an electrolyte solution. It is known that certain additions to these chloride-containing solutions may bring about a further enlargement of the effective surface, which results in an increase of the capacity per surface unit.

Thus, it is known, for example, from the United Kingdom Specification 1,110,131 to add anions to the usual electrolyte solutions for etching such as borate, phosphate, oxalate, nitrate or citrate ions. Such additions result in an enlargement of the effective surface by 30 to 50 percent.

It is also known from the United Kingdom Specification 1,181,556 that a further increase of the "etching factor," which is the term used to indicate the enlargement factor of the effective surface, can be achieved by using hard foil as a basic product instead of the commonly used soft annealed foil. However, this has practical drawbacks of a mechanical nature, especially when using broad coils of foil. After etching the foil is rather brittle, stiff and has a low stretch. In addition the foil must be soft annealed after etching. By carrying out the latter method in accordance with a method specified in this patent application a further increase of the etching factor is obtained.

The present invention provides an etching method in which the enlargement of the effective surface is such that the combined effect of use of the known additions and the choice of hard foils is equalled while yet starting from a soft foil.

The method according to the invention is characterized in that boric acid is added to a concentration of 1 to 5 mol per litre to the etching electrolyte solution which consists of an aqueous solution of an alkali halide likewise in a concentration of from 1 to 5 mol per litre, while the pH of the solution is maintained at a value of between 0 and 2.5.

The adjustment of the pH-value may be effected advantageously be means of sulphuric acid, but hydrochloric acid may alternatively be used. The pH-value is preferably maintained between 1 and 1.5.

Boric acid is present in the solution preferably in a concentration of from 2.5 to 3.5 mol per litre.

According to the first-mentioned patent application boric acid is added in a quantity of between 0.1 and 1 mol per litre to an etching electrolyte, while the pH is maintained neutral. The improvement of the etching factor achieved thereby relative to the method employing an electrolyte solution without an addition is considerably less than that according to the invention. Likewise as in the known methods employing additions in the etching liquid, the addition according to the invention results in a reduced mechanical stretch of the foil obtained. Therefore also according to the invention, a preferred embodiment of the method employs a reduced quantity of electric charge as compared with the conventional quantity. This results in an increase of the tensile strength of the foil obtained so that it is sufficiently strong for practical use as well as for machine forming and continuous forming.

The known step of a thermal post-treatment of the etched foil results in a still further enlargement of the effective capacitive surface of the foil when the foil is heated at a temperature of between 400° and 650°C in an oxygen-containing atmosphere. The period during which the foil must be thermally post-treated depends on the temperature chosen. If a certain maximum value of the period is exceeded, initially high capacitances become manifest which, however, are greatly decreased in an unreproducible manner when the foil is finished. An empirical relationship between the maximum heating duration $t$ (in seconds) and the chosen temperature of treatment T (in °K) was found:

$$\log t = 90.2 - 30 \log T$$

The foil is preferably treated during the period which covers at least 24 percent of the maximum period of time found in accordance with this formula.

In order that the invention may be readily carried into effect, it wil now be described in detail by way of some examples.

Soft aluminum foil which was heated for 4 hours at 550°C and which had a thickness of 80 microns and a purity of 99.98 percent was electrochemically etched at a pulsatory direct current being smoothed by 80 percent in an aqueous solution of 100°C containing per litre: 300 gms of sodium chloride and 100 gms of boric acid.

Table I gives a survey of the physical values obtained from a foil which is etched in such an electrolyte liquid as compared with a foil which is etched in an electrolyte liquid consisting of a solution of 300 gms per litre of sodium chloride only (1). DUring these experiments the following values were varied: the electric charge in Coulombs per sq.dm of surface calculated on both sides, the current density (i) in A/sq.dm and the pH adjusted with HCl and with $H_2SO_4$. Comparative capacitances are given for the foil which is formed at three different voltages. Finally the impact strength is stated, measured on 15 mm wide strips of foil expressed in cm.kg. In some cases comparative measured values are also given for hard foil which is etched in the same manner. Table II states some properties of the foil electrolytically etched in a bath whose composition is varied.

TABLE I

| Number | $P_H$ etching sol. | $P_H$ adjusted with | Electr. charge (coul/ sq. dm) | i (A/ dm.²) | Capacity in µF/cm.², formed at— | | | | | | Impact strength (cm. kg.) | |
|---|---|---|---|---|---|---|---|---|---|---|---|---|
| | | | | | 6V | | 50V | | 90V | | | |
| | | | | | Hard | Soft | Hard | Soft | Hard | Soft | Hard | Soft |
| 1 | 7 | HCl | 4,500 | 80 | 95 | 51 | 8.4 | 4.8 | 3.5 | 2.1 | 0.11 | 0.71 |
| 2 | 2.5 | HCl | 4,500 | 40 | | 101 | | 8.8 | | 3.6 | | 0.08 |
| 3 | 2.5 | HCl | 4,000 | 40 | | 96 | | 8.2 | | 3.3 | | 0.34 |
| 4 | 2.5 | HCl | 3,500 | 40 | | 85 | | 7.2 | | 3.0 | | 0.47 |
| 5 | 2.5 | HCl | 2,000 | 40 | | 62 | | 5.0 | | 2.0 | | |
| 6 | 2.8 | HCl | 3,500 | 85 | 128 | 58 | 10.3 | 5.6 | 3.7 | 2.4 | 0.19 | 0.62 |
| 7 | 3.1 | HCl | 3,500 | 85 | 121 | 55 | 9.8 | 4.7 | 3.6 | 1.9 | 0.20 | 0.84 |

TABLE I – Continued

| Number | P_H etching sol. | P_H adjusted with | Electr. charge (coul/sq. dm) | i (A/dm.²) | Capacity in μF/cm.², formed at— | | | | | | Impact strength (cm. kg.) | |
|---|---|---|---|---|---|---|---|---|---|---|---|---|
| | | | | | 6V | | 50V | | 90V | | | |
| | | | | | Hard | Soft | Hard | Soft | Hard | Soft | Hard | Soft |
| 8 | 1.0 | H₂SO₄ | 3,500 | 80 | 107 | | 8.7 | | 3.3 | | | 0.45 |
| 9 | 1.5 | H₂SO₄ | 3,500 | 80 | 109 | | 8.8 | | 3.5 | | | 0.55 |
| 10 | 2.0 | H₂SO₄ | 3,500 | 40 | 90 | | 8.0 | | | | | 0.38 |
| 11 | 2.5 | H₂SO₄ | 3,500 | 40 | 79 | | 7.1 | | | | | 0.51 |
| 12 | 3.0 | H₂SO₄ | 3,500 | 40 | 67 | | 6.0 | | | | | 0.84 |

TABLE II

| Number | NaCl g./100 ml. | H₃BO₃ | P_H etching sol. | P_H adjusted with | Electr. charge (C./dm.²) | i (A/dm.²) | Capacity (μF/cm.²), formed at— | | | | | | Impact strength (cm. kg.) | |
|---|---|---|---|---|---|---|---|---|---|---|---|---|---|---|
| | | | | | | | 6V | | 50V | | 90V | | | |
| | | | | | | | Hard | Soft | Hard | Soft | Hard | Soft | Hard | Soft |
| 13 | 200 | | 1.5 | H₂SO₄ | 3,500 | 85 | | 82 | | 6.8 | | 3.0 | | 0.56 |
| 14 | 200 | 50 | 1.5 | H₂SO₄ | 3,500 | 85 | | 81 | | 6.7 | | 3.0 | | 0.70 |
| 15 | 200 | 100 | 1.5 | H₂SO₄ | 3,500 | 85 | | 92 | | 7.5 | | 3.3 | | 0.44 |
| 16 | 200 | 150 | 1.5 | H₂SO₄ | 3,500 | 85 | | 103 | | 8.2 | | 3.5 | | 0.37 |
| 17 | 200 | 200 | 1.5 | H₂SO₄ | 3,500 | 85 | | 125 | | 9.3 | | 3.7 | | 0.52 |
| 18 | 250 | 200 | 1.5 | H₂SO₄ | 3,500 | 85 | | 139 | | 9.6 | | 3.6 | | 0.57 |
| 19 | 300 | 200 | 1.5 | H₂SO₄ | 3,500 | 85 | 136 | 142 | 9.0 | 9.5 | 3.3 | 3.45 | 0.18 | 0.51 |
| 20 | 100 | 200 | 1.0 | H₂SO₄ | 3,500 | 85 | 143 | 90 | 10.8 | 8.0 | 3.9 | 3.2 | 0.12 | 0.57 |
| 21 | 150 | 200 | 1.0 | H₂SO₄ | 3,500 | 85 | 146 | 102 | 10.8 | 9.0 | 37 | 36 | 0.11 | 0.52 |
| 22 | 200 | 200 | 1.0 | H₂SO₄ | 3,500 | 85 | 159 | | 11.5 | | 3.8 | | 0.11 | |
| 23 | 300 | 100 | 7.4 | NaOH | 3,500 | 85 | | 65 | | 5.2 | | | | 0.67 |
| 24 | 300 | 100 | 7.4 | NaOH | 4,500 | 85 | | 82 | | 6.5 | | | | 0.23 |

We claim:

1. A method of treating aluminum metal to increase the effective surface thereof, said method comprising electrolytically etching said metal in an electrolyte solution having a pH of between 0 and 2.5 and containing 1–5 mols per liter of sodium chloride and 1–5 mols per liter of boric acid.

2. The method of claim 1 wherein the pH of the solution lies between 1 and 1.5.

3. The method of claim 2 wherein the solution contains boric acid in an amount of between 2.5–3.5 mols per liter.

4. The method of claim 2 wherein after etching the metal is heated at a temperature of between 400° and 650°C for a maximum period of time $t$ in seconds related to the heating temperature $T$ in $°_K$ according to the equation:

$\log t = 90.2 - 30 \log T$.

5. An electrode foil manufactured by the method of claim 1.

* * * * *

PO-1050
(5/69)

UNITED STATES PATENT OFFICE
CERTIFICATE OF CORRECTION

Patent No. 3,755,115 (PHN 4526) Dated August 28, 1973

Inventor(s) AREND VAN HERWIJNEN ET AL

It is certified that error appears in the above-identified patent and that said Letters Patent are hereby corrected as shown below:

Column 2, line 29, "24 percent" should read -- 25 percent --;

line 32, "wil" should read -- will --.

line 46, "DUring" should read -- During --.

Last line of abstract:

"2.5.2.5" should read -- 2.5. --.

Signed and sealed this 18th day of December 1973.

(SEAL)
Attest:

EDWARD M. FLETCHER, JR.
Attesting Officer

RENE D. TEGTMEYER
Acting Commissioner of Patents